Oct. 13, 1931.  J. F. SANFTLEBEN  1,827,113
APPARATUS FOR USE IN PREVENTING INCRUSTATION OF WATER COOLED ENGINES
Filed May 15, 1928
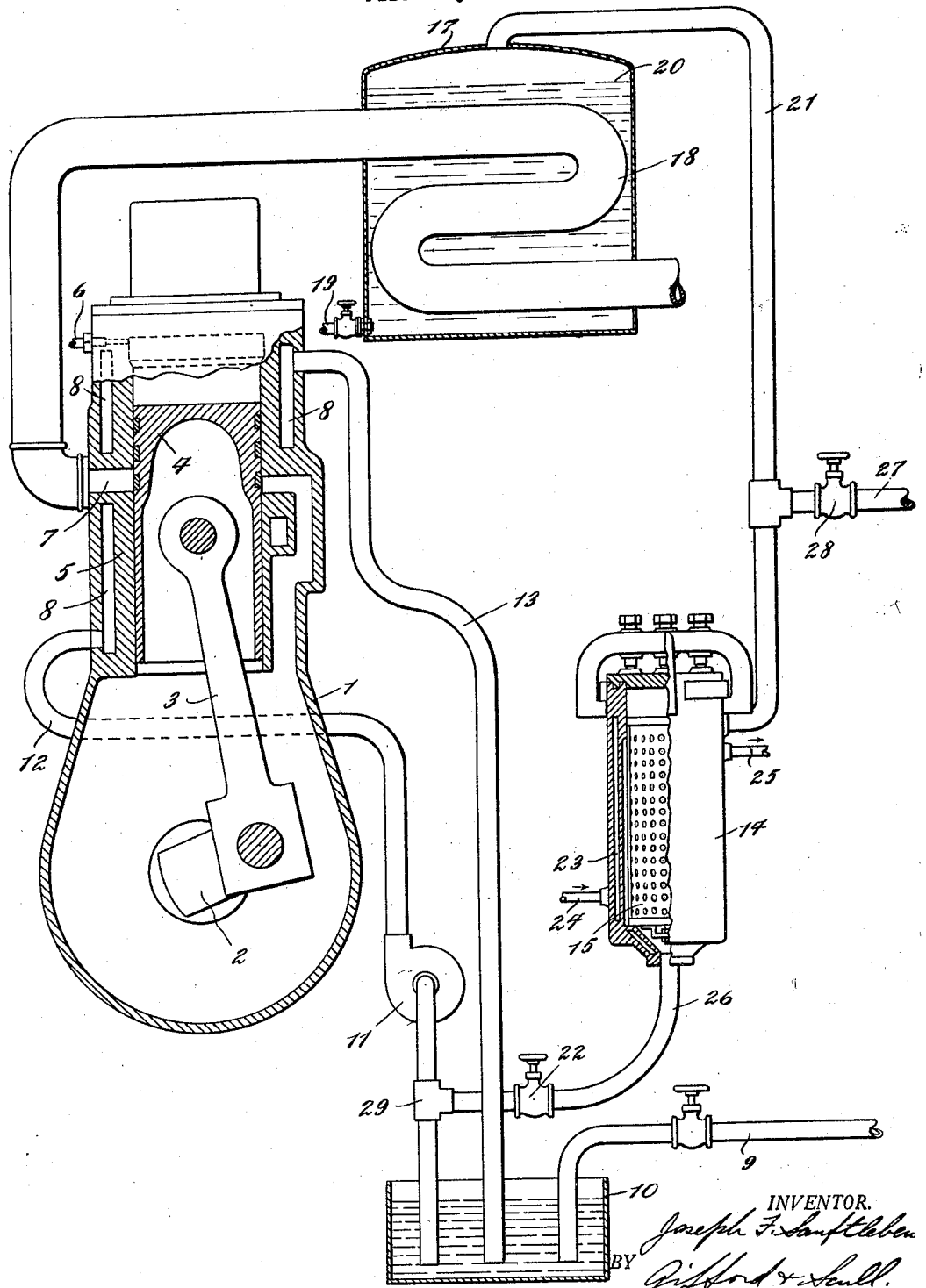
INVENTOR.
Joseph F. Sanftleben
BY Gifford & Scull
ATTORNEYS.

Patented Oct. 13, 1931

1,827,113

UNITED STATES PATENT OFFICE

JOSEPH F. SANFTLEBEN, OF NEW YORK, N. Y., ASSIGNOR TO FILTRATORS COMPANY, INC., OF NEW YORK, N. Y., A CORPORATION OF NEW YORK

APPARATUS FOR USE IN PREVENTING INCRUSTATION OF WATER COOLED ENGINES

Application filed May 15, 1928. Serial No. 277,830.

This invention relates to a novel apparatus and means for preventing the formation of scale or rust in the part of an engine through which water is circulated, particularly for cooling purposes.

The invention will be best understood from the following description and the accompanying drawing, in which the figure shows a diagrammatic arrangement of parts of a selected embodiment of my invention.

Referring to the drawing, I show therein a Diesel engine having a casing 1 in which is disposed the usual crank 2 operated by a plurality of pistons and piston rods, one only of which is shown in this figure, the piston rod being indicated at 3 and the piston at 4. The piston reciprocates in the usual cylinder 5 which is provided with the inlet port 6 and the exhaust port 7. As is common in this type of engine, the cylinder is provided with a water jacket 8 through which water is normally circulated to cool the cylinder.

In the form shown, the water is conducted through a suitable pipe line 9 to a tank or reservoir 10, from which it is delivered by a pump 11 through the inlet pipe 12 to the jacket 8, from which it returns to the tank by the pipe 13.

Because of the high temperatures generated in the cylinders of the engine, scale forms rapidly and, in order to offset the formation of scale, I treat the water passing through the jacket. The numeral 14 designates a closed vessel having a perforated container 15 which holds a suitable material for the formation of the water treating substance. Preferably, I use vegetable seeds containing a mucilaginous substance, (as for instance, flaxseed) so that the passage of the condensed steam through the seeds will extract such substance, the vessel 14 being cooled to condense the steam. The formation of this substance, in itself, is known in the art.

The steam may be conveniently generated in a boiler 17, in which is inserted a coil 18 forming part of the exhaust pipe from the engine, to which it is connected at the port 7. Water is admitted to the boiler at 19, and the normal water level is indicated at 20. Steam from the space above the water is discharged through the pipe 21 into the vessel 14, in which it comes in contact with the material therein. The vessel is provided with a water jacket 23, through which water circulates between the inlet 24 and the outlet 25, and thus the steam is condensed. The mucilaginous extract from the vessel 14 discharges through the pipe 26. This pipe is connected to the pipe leading from the tank 10 to the pump 11, so that the extract passing from the vessel 14 may mix with the water being pumped to the water jacket or jackets of the engine.

A valve 22 may be provided to maintain the pressure in the vessel 14, the valve being "cracked" sufficiently to permit the extract to escape without permitting the pressure to drop materially. Any other usual means may be provided for this purpose.

Connected to the pipe 21 between the boiler and the vessel 14 is a pipe 27 having a valve 28 therein, through which live steam from any suitable source may be admitted to the vessel 14, if the supply from the boiler 17 is insufficient for any reason.

In operation, and assuming that a suitable amount of water is present in the tank 10 and the boiler 17, the pump 11 is started in operation and water is circulated through the jacket or jackets 8 in the usual manner. The pump 11 may be conveniently operated from the engine itself by any suitable mechanism, not shown. The steam generated in the boiler 17 passes into the vessel 14 and there acts on the material in the container 15 to form the extract which constitutes a preventative of incrustation. This substance passes through the pipe 26 partially by gravity and partially by the suction created by the pump 11. If the pump is delivering water to the jacket, the substance will mingle with this water at the junction 29, and if for any reason the pump is not working, the substance will be delivered to the tank 10.

I claim:—

1. In combination, an engine having a part cooled by water, a boiler heated by waste heat from said engine, a container for material adapted to form a water treating substance, means to discharge steam from said boiler into said container to act on said material to form said substance, and means to discharge said substance from the container into the water entering said part of the engine.

2. In combination, an engine having a part to be cooled by water circulating therethrough, a boiler heated by waste heat from said engine, a container for material adapted to form a water treating substance, means for passing steam from said boiler through said material to act on the same and thus form said substance, a source of water supply, means to deliver said substance to said water, and means to deliver the water with the substance therein to said part.

3. In combination, an engine having a part to be cooled by water circulating therethrough, a boiler heated by waste heat from said engine, a container for material adapted to form a water treating substance, means for passing steam from said boiler through said material to act on the same and thus form said substance, a source of water supply, a pipe to deliver water from said supply to said part, a connection from said container to said pipe, and a pump to force water through said pipe.

4. In combination, an engine having a part adapted to be cooled by water circulating therethrough, a tank adapted to contain said water, a circulating system including said tank and part and having a pump therein adapted to cause the water to circulate through the system, a container for material adapted to form a water treating substance, a boiler heated by waste heat from said engine, means to deliver steam from said boiler to said container, and a connection from said container to said system between the tank and the pump, whereby material passing from said container through said connection may be forced by said pump through said system.

5. In combination, an engine having a part adapted to be cooled by water circulating therethrough, a tank adapted to contain said water, a circulating system including said tank and part and having a pump therein adapted to cause the water to circulate through the system, a container for material adapted to form a water treating substance, a boiler heated by waste heat from said engine, means to deliver steam from said boiler to said container, a connection from said container to said system between the tank and the pump, whereby material passing from said container through said connection may be forced by said pump through said system, and a valve in said connection to regulate the pressure in said container.

JOSEPH F. SANFTLEBEN.